United States Patent
Park et al.

(10) Patent No.: US 11,679,743 B2
(45) Date of Patent: *Jun. 20, 2023

(54) MULTI-VALVE PUMP HEAD

(71) Applicant: Bell Sports, Inc., Scotts Valley, CA (US)

(72) Inventors: Stephen C. Park, Diamond Bar, CA (US); Andy Yu Sang Chan, Chai Wan (HK)

(73) Assignee: Bell Sports, Inc., Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/560,017

(22) Filed: Dec. 22, 2021

(65) Prior Publication Data

US 2022/0258701 A1 Aug. 18, 2022

Related U.S. Application Data

(63) Continuation of application No. 17/110,066, filed on Dec. 2, 2020, now Pat. No. 11,235,738.

(60) Provisional application No. 62/942,385, filed on Dec. 2, 2019.

(51) Int. Cl.
*B60S 5/04* (2006.01)
*F16K 15/20* (2006.01)
*F04B 33/00* (2006.01)

(52) U.S. Cl.
CPC ............ *B60S 5/043* (2013.01); *F04B 33/005* (2013.01); *F16K 15/20* (2013.01)

(58) Field of Classification Search
CPC .......... B60S 5/04; B60S 5/043; F04B 33/005; F16K 15/20
See application file for complete search history.

(56) References Cited

U.S. PATENT DOCUMENTS

| | | | | |
|---|---|---|---|---|
| 5,638,865 A | * | 6/1997 | Wu | F16K 11/0876 251/352 |
| 5,960,815 A | * | 10/1999 | Wang | F04B 33/005 137/119.06 |
| 6,076,544 A | * | 6/2000 | Pierce | F16L 37/18 251/149.8 |
| 6,105,600 A | * | 8/2000 | Wang | B60S 5/04 137/231 |

(Continued)

*Primary Examiner* — Nicolas A Arnett
(74) *Attorney, Agent, or Firm* — Walter M. Egbert, III; Richard J. Brown; Reed Smith LLP

(57) ABSTRACT

A pump head configured to secure various air valve types is disclosed. The pump head may include a housing and an interior unit sized and shaped to receive a valve head. A moveable pin disposed within the housing coaxially with the first axis may define a pin notch disposed about an exterior circumference of the moveable pin. A first taper unit may be disposed in the housing coaxially with the first axis and coupled to the pin return spring. A second taper unit may be disposed in the housing coaxially with the first axis and adjacent to the first taper unit. An elastic taper C-ring may be disposed between the first and second taper units. The second taper unit is moveable towards the first taper unit, thereby compressing the elastic taper C-ring circumferentially in at least one of two positions, the elastic taper C-ring compressed about the pin notch in the first position and about the valve head in the second position.

20 Claims, 8 Drawing Sheets

(56) References Cited

U.S. PATENT DOCUMENTS

| | | | | |
|---|---|---|---|---|
| 6,105,601 A * | 8/2000 | Wang | ............ | F16K 31/54 251/149.6 |
| 6,146,116 A * | 11/2000 | Wu | ............ | F04B 33/005 137/231 |
| 6,220,273 B1 * | 4/2001 | Wu | ............ | F04B 33/005 137/231 |
| 6,260,572 B1 * | 7/2001 | Wu | ............ | F04B 33/005 137/231 |
| 6,276,405 B1 * | 8/2001 | Wang | ............ | F04B 33/005 141/38 |
| 6,289,920 B1 * | 9/2001 | Wang | ............ | F16L 37/18 251/65 |
| 6,328,057 B1 * | 12/2001 | Wang | ............ | B60S 5/04 417/511 |
| 6,978,796 B2 * | 12/2005 | Ostrowiecki | ............ | F16K 17/0413 137/231 |
| 7,032,612 B2 * | 4/2006 | Shipman | ............ | F16K 15/20 137/231 |
| 7,866,335 B2 * | 1/2011 | Wang | ............ | F04B 33/005 137/231 |
| 8,539,971 B2 * | 9/2013 | Wang | ............ | F16K 11/048 137/625.48 |
| 9,249,914 B2 * | 2/2016 | Kuo | ............ | F16L 37/1215 |
| 9,388,914 B2 * | 7/2016 | Wang | ............ | F16K 11/04 |
| 9,702,471 B1 * | 7/2017 | Wang | ............ | F04B 39/126 |
| 9,855,928 B2 * | 1/2018 | Currie | ............ | F04B 33/005 |
| 9,989,179 B2 * | 6/2018 | Wang | ............ | F04B 33/00 |
| 9,989,180 B2 * | 6/2018 | Wang | ............ | B60S 5/04 |
| 10,247,319 B1 * | 4/2019 | Wang | ............ | F16K 15/20 |
| 10,280,912 B2 * | 5/2019 | Wang | ............ | F16K 1/00 |
| 10,443,588 B2 * | 10/2019 | Park | ............ | B25B 27/0071 |
| 11,235,738 B2 * | 2/2022 | Park | ............ | B60S 5/043 |
| 2009/0104059 A1 * | 4/2009 | Wang | ............ | F04B 33/005 417/528 |
| 2013/0206249 A1 * | 8/2013 | Wu | ............ | F04B 33/00 137/231 |
| 2015/0053280 A1 * | 2/2015 | Wang | ............ | F16L 37/28 137/231 |
| 2015/0316160 A1 * | 11/2015 | Wang | ............ | B60C 29/064 141/383 |
| 2015/0330525 A1 * | 11/2015 | Wang | ............ | B60C 25/18 137/231 |
| 2016/0272167 A1 * | 9/2016 | Zalzalah | ............ | F16L 37/28 |
| 2018/0281754 A1 * | 10/2018 | Staples | ............ | F04B 39/125 |

\* cited by examiner

MULTI-VALVE PUMP HEAD

CROSS-REFERENCE TO RELATED APPLICATIONS

This application is a continuation of U.S. application Ser. No. 17/110,066, filed Dec. 2, 2020 titled "Multi-Valve Pump Head," and claims the benefit of U.S. provisional patent application 62/942,385, filed Dec. 2, 2019, titled "Multi-Valve Pump Head," the entirety of the disclosures of both of which are incorporated herein by reference.

TECHNICAL FIELD

Aspects of the present disclosure generally relate to pump head, more particularly to a multi-valve pump head for use with multiple air valve configuration.

BACKGROUND

Air chambers, such as those found in bicycle tires and other inflatable devices, use a variety of air valves for sealing and inflating the air chamber. The most common air valves are Schrader, Presta, and Dunlop valves for interacting with a pump designed to fill the chamber to a desired air pressure. The variety of valves in the market has created a need for universal pump heads usable with any valve with minimal inconvenience to a user. Previous pump heads have used clamp jaws, tapered jaws, and tapered housings to clamp to and retain the air valve during inflation. Other pump heads have utilized interchangeable parts or separate ports for connecting to the different valve types. However, these previous efforts resulted in large, bulky pump heads, inconvenient user experiences, complex assemblies, and high costs.

SUMMARY

The present disclosure generally provides for a lightweight, compact, universal pump head for forming airtight connections with air valves. Aspects of the pump head provide a user the ability to secure and form a connection with an air valve without extensive setup or alterations to the pump or pump head. The system and method allow a user to quickly connect and disconnect the pump head to an air valve. While the present disclosure is discussed in regards to Schrader and Presta air valves, it will be understood by one skilled in the art that the present disclosure will function with other types of air valves known in the art.

According to one aspect, the present disclosure provides a pump head configured to secure an air valve. The pump head may include a housing and an interior unit. The pump head may also include a lock arm for securing the air valve. The housing may include an aperture operatively sized to receive the air valve. The interior unit is located within the housing and may include a moveable pin operatively configured to press against and open the air valve while the lock arm is engaged. The moveable pin may be held against the air valve by a compressed elastic taper C-when the lock arm is engaged. A pin notch disposed on an exterior of the moveable pin may be configured to receive the elastic taper C-ring when the lock arm is engaged. The elastic taper C-ring may operate by securing the moveable pin or the air valve. The lock arm may be disengaged to release the air valve.

According to another aspect, a pump head may include a housing and an interior unit. The housing may include an aperture operatively sized to receive an air valve. A grommet may be located between the aperture and the housing. The grommet may be sized to receive a Schrader air valve while allowing a thinner air valve, such as a Presta air valve, to pass through the grommet.

The interior unit is located within the housing and may include a first taper unit and a second taper unit. An elastic taper C-ring may be located between the first taper unit and the second taper unit. A moveable pin may be mounted to a return spring used to position the moveable pin in a pin rest position. While in the pin rest position, the elastic taper C-ring may be disposed about an exterior of the moveable pin. A guide may be positioned along an axis of the moveable pin to assist the moveable pin in moving within the interior unit.

A lock arm positioned on an exterior of the housing may be operatively configured to press the second taper unit towards the first taper unit when engaged. Thereby compressing the elastic taper C-ring between the first taper unit and the second taper unit. The compressed elastic taper C-ring may secure the moveable pin or the air valve.

The above summary has outlined, rather broadly, some features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material, or acts in support of the function. Thus, even when the claims recite a "means for performing the function of . . . "or "step for performing the function of . . . ," if the claims also recite any structure, material, or acts in support of that means or step, or to perform the recited function, it is the clear intention of the inventors not to invoke the provisions of 35 U.S.C. § 112, ¶6. Moreover, even if the provisions of 35 U.S.C. § 112, ¶6, are invoked to define the claimed aspects, it is intended that these aspects not be limited only to the specific structure, material, or acts that are described in the preferred embodiments, but in addition, include any and all structures, material, or acts that perform the claimed function as described in alternative embodiments or forms in the disclosure, or that are well-known present or later-developed, equivalent structures, material, or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details.

Figure 1:
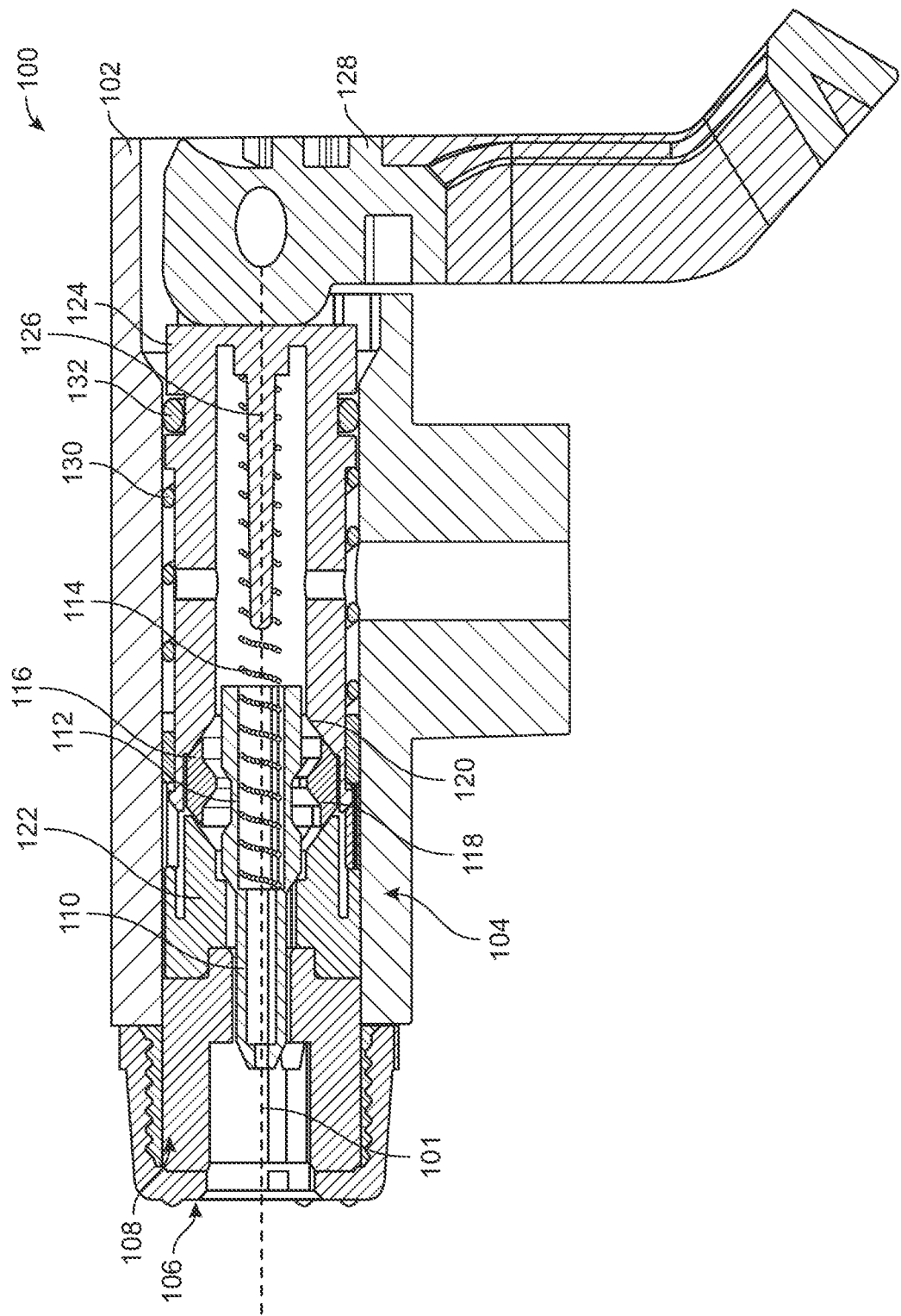
FIG. 1 depicts a side cross section view of a pump head according to one aspect of the present disclosure.

FIG. 1 depicts a side cross section view of a pump head 100 according to one aspect of the present disclosure. The pump head 100 may include a housing 102 and an interior unit 104 located within the housing 102. The pump head 100 may also define an aperture 106 formed by the housing 102 about an axis 101. A grommet 108 may be disposed between the housing 102 and the aperture 106. The grommet 108 may be made of a compressible material, such as rubber, and be sized and shaped to provide a sealing engagement around a valve when inserted into the pump head 100. The grommet 108 may be configured to help hold the pump head 100 onto the valve and to create an air seal. If the interior diameter of the grommet is too small then may be hard for the user to place the pump head 100 onto the valve easily. Even if the grommet does receive the valve, then another issue may arise in which it may be difficult to separate the pump head 100 from the valve when inflation is complete. On the other hand, if the grommet 108 is too large then it will not seal properly around the valve when the grommet is compressed. This may cause a leak or a loose fit causing the pump head 100 to disengage the valve when trying to inflate the tire to high pressures.

According to one aspect, the grommet 108 may include a first portion 109 and a second portion 111. The first portion 109 of the grommet 108 may have a diameter about the same size as a Schrader-type valve. The second portion 111 may have a diameter matching that of a Presta-type valve. An O-ring 132 may be disposed between the interior unit 104 and the housing 102 providing a moveable seal between the interior unit 104 and the housing 102. The interior unit 104 may be in fluid communication with the aperture 106 allowing an air valve (not shown) to engage the pump head 100.

The interior unit 104 may include a moveable pin 110 defining a pin notch 112 on an exterior of the moveable pin 110. The moveable pin 110 may be coupled to a pin return spring 114 that is biased along the axis 101 to return the moveable pin 110 to a pin rest position when the pump head 100 is not in use. An elastic taper C-ring 116 may be disposed about the pin notch 112 when the moveable pin 110 is in the pin rest position. The elastic taper C-ring 116 may include a first elastic taper C-ring side 118 and a second elastic taper C-ring side 120. A first taper unit 122 may be adjacent to the first elastic taper C-ring side 118. A second taper unit 124 may be adjacent to the second elastic taper C-ring side 120. According to an aspect of the present disclosure, the first taper unit may be fixed within the housing 102 and the second taper unit may be negatively biased away from the first taper unit, for example by a withdraw spring 130.

The second taper unit 124 may include a guide 126 operatively configured to assist the moveable pin 110 in moving within the interior unit 104. The guide 126 may be positioned along the axis 101 of the moveable pin 110 and coupled to the pin return spring 114. For example, when a thinner air valve (not shown), such as a Presta-type air valve, is present in the aperture 106 the moveable pin 110 may travel along the guide 126 to remain in fluid communication with the air valve (not shown) as shown in FIG. 5B. When the air valve is absent from the pump head 100, the moveable pin 110 may return to the pin rest position by the pin return spring 114.

A lock arm 128 disposed on an exterior of the housing 102 may be engaged to press the second taper unit 124 towards the first taper unit 122, against the bias of the withdraw spring 130, thereby compressing the elastic taper C-ring 116. According to one aspect, the lock arm 128 may be pivotally coupled to the housing 102 such that when the lock arm 128 is pivoted to a raised position, the lock arm 128 may press the second taper unit toward first taper unit. The elastic taper C-ring may be compressed in one of at least two positions, including a first position whereby the elastic taper C-ring is compressed about the pin notch 112 or a second position whereby the elastic taper C-ring 116 is compressed about the head of an inserted air valve (not shown), as further shown in FIGS. 5A and 5B, respectively. According to one aspect of the present disclosure, the first position may correspond to the insertion of a Schrader-type valve, while the second position may correspond to a Presta-type valve.

If the lock arm 128 is disengaged, i.e., pivoted to a lowered position as shown in FIG. 1, the withdraw spring 130 may push the second taper unit 124 away from the first taper unit 122, thereby allowing the elastic taper C-ring 116 to decompress and release the moveable pin 110. The moveable pin 110 is thusly able to move and the air valve (not shown) may be removed from the pump head 100.

Figure 2A:
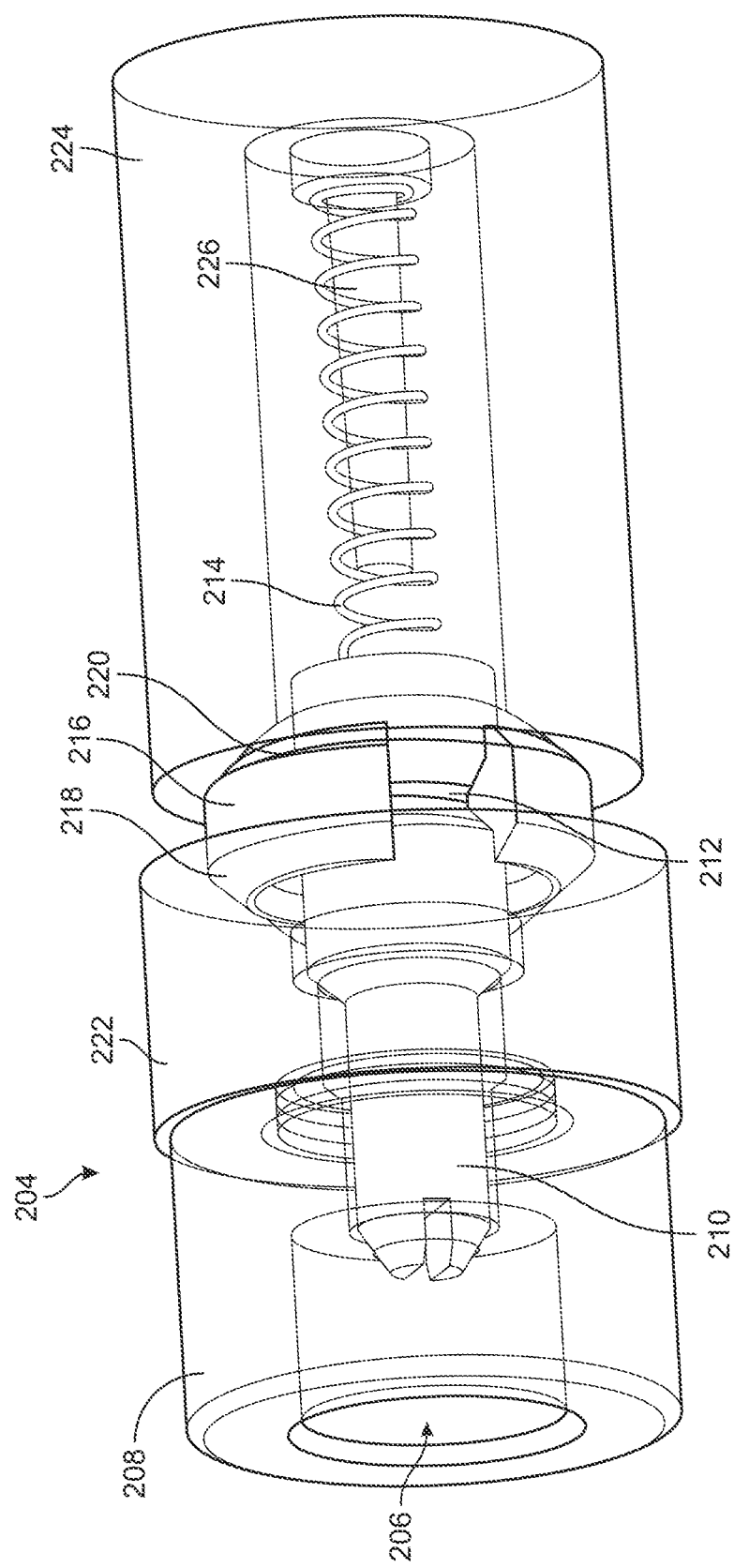
FIG. 2A depicts a side view of an interior unit of a pump head according to one aspect of the present disclosure.
Figure 2B:
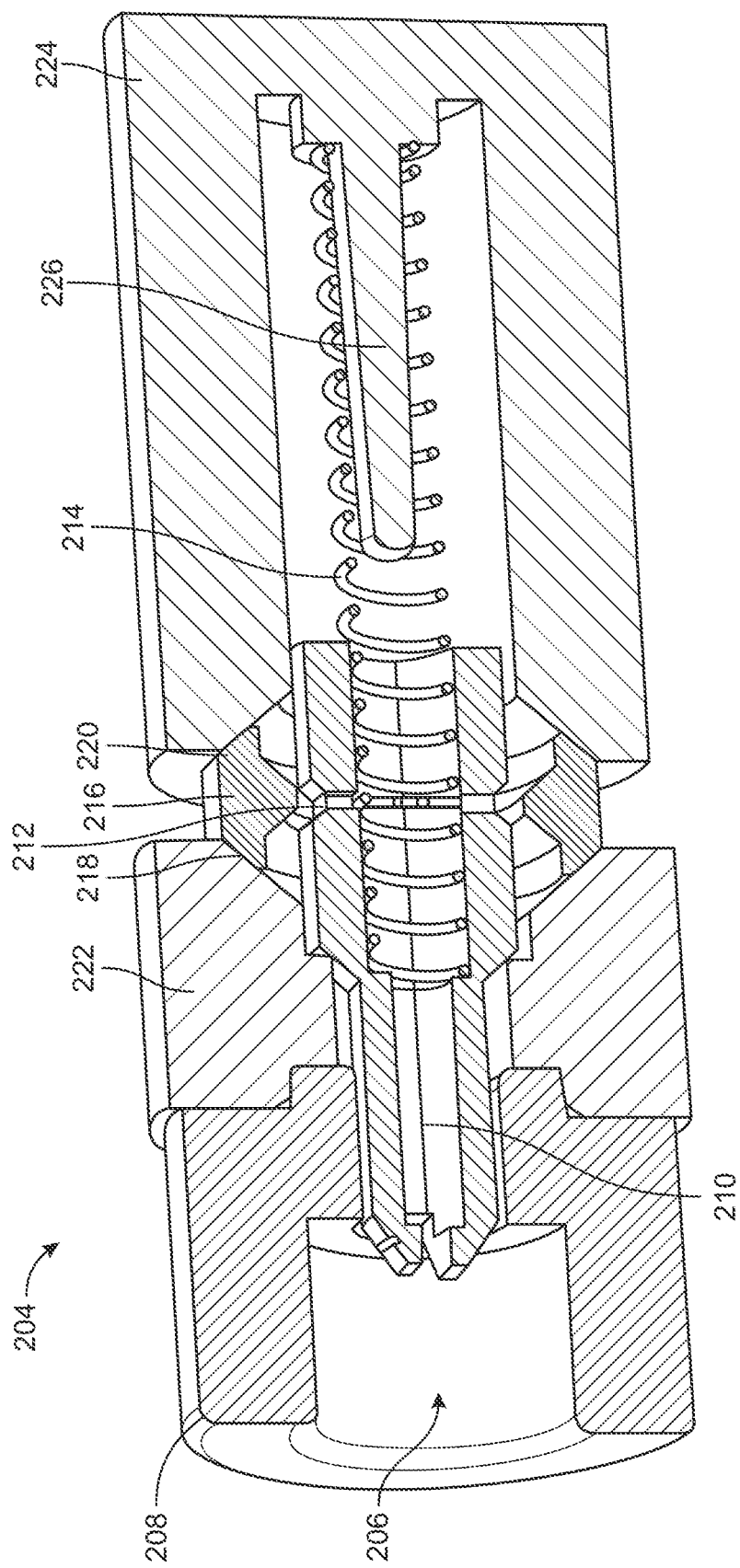
FIG. 2B depicts a side cross section view of the interior unit of FIG. 2A.

FIG. 2A depicts a side view of an interior unit 204 of a pump head according to one aspect of the present disclosure. FIG. 2B depicts a side cross section view of the interior unit 204 of FIG. 2A. The interior unit 204 may include grommet 208 disposed adjacent to an aperture 206 defined by a housing (not shown). A moveable pin 210 may be in fluid connection with the aperture 206 and coupled to a pin return spring 214. The pin return spring 214 may return the moveable pin 210 to a pin rest position when the pump head is not in use. A guide 226 may be positioned along an axis of the moveable pin 210. The guide 226 may be operatively configured to assist the moveable pin 210 in moving within the interior unit 204. The guide 226 may be coupled to the pin return spring 214.

A pin notch 212 may be defined about an exterior of the moveable pin 210. While the moveable pin 210 is in the pin rest position, an elastic taper C-ring 216 may be disposed about the pin notch 212. The elastic taper C-ring 216 includes a first elastic taper C-ring side 218 and a second elastic taper C-ring side 220. The first elastic taper C-ring side 218 may be adjacent to a first taper unit 222. The second elastic taper C-ring side 220 may be adjacent to a second taper unit 224.

Figure 3:
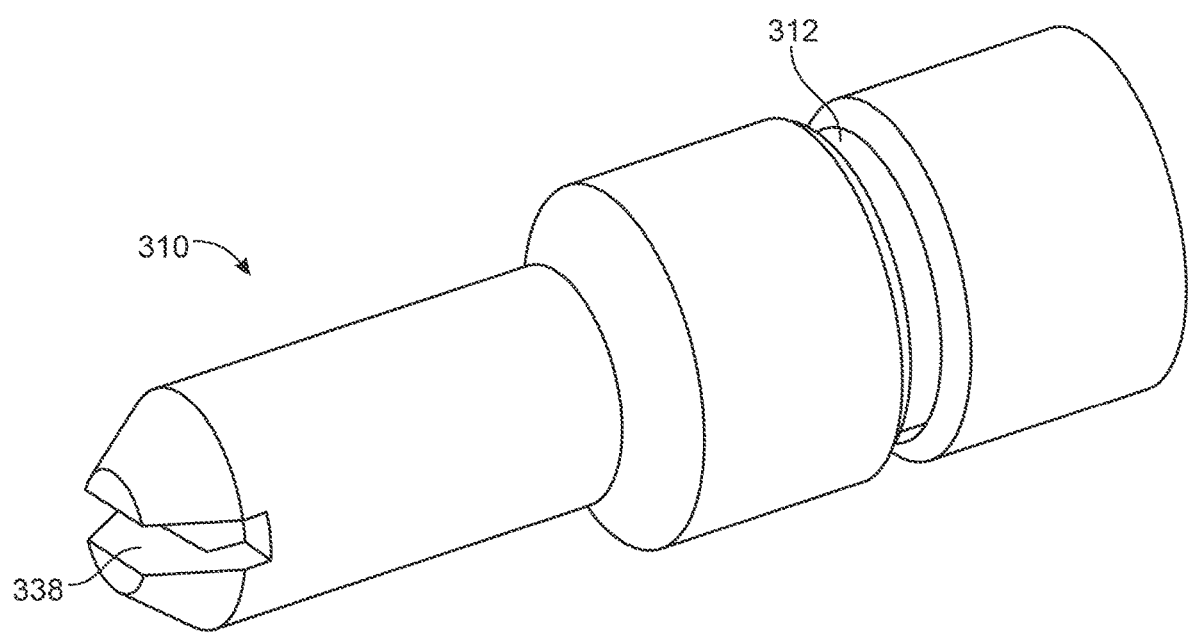
FIG. 3 depicts a perspective view of a moveable pin of a pump head according to one aspect of the present disclosure.

FIG. 3 depicts a perspective view of a moveable pin 310 of a pump head according to one aspect of the present disclosure. The moveable pin 310 may define or include a pin notch 312 about a circumference of an exterior of the moveable pin 310. The moveable pin 310 may further define or include a pin head notch 338 near a head portion of the moveable pin 310. As described herein, the pin head notch may engage a pin or other structural component of a valve when inserted and coupled to the pump head.

Figure 4B:
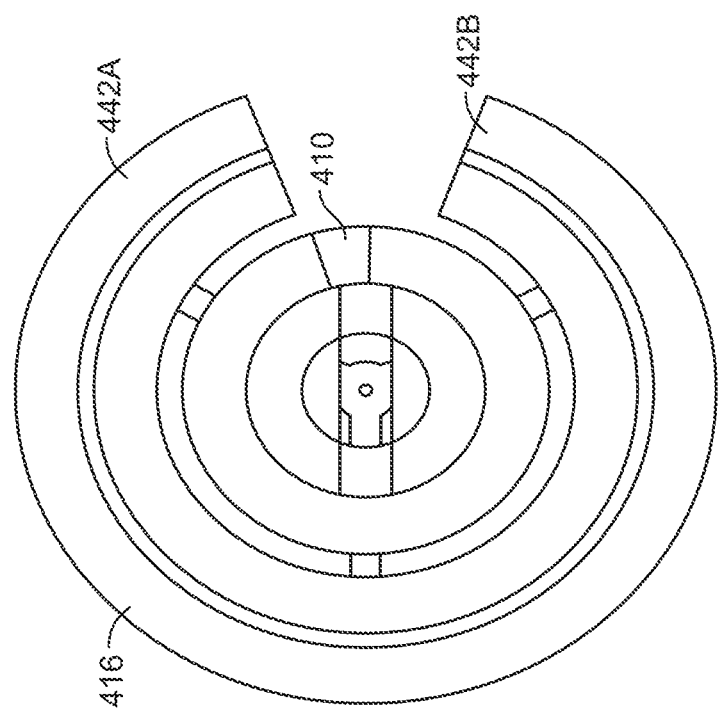
FIG. 4B depicts a front view of a moveable pin with an elastic taper C-ring according to one aspect of the present disclosure.
Figure 4A:
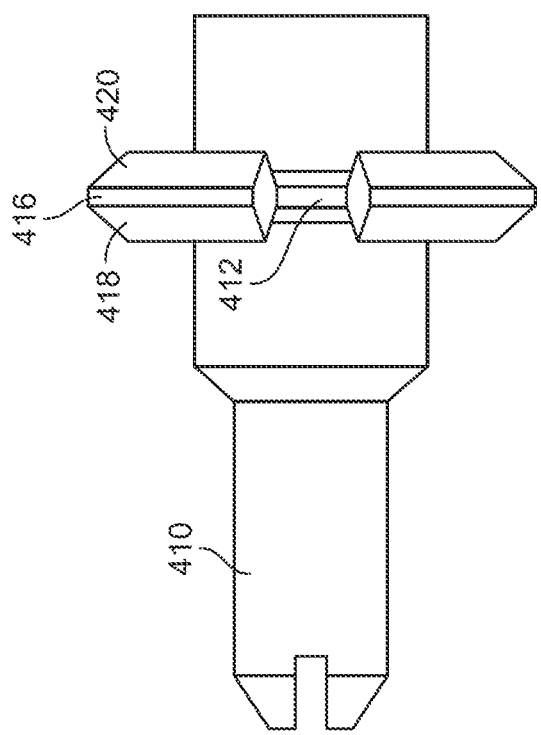
FIG. 4A depicts a side view of a moveable pin with an elastic taper C-ring according to one aspect of the present disclosure.
Figure 4C:
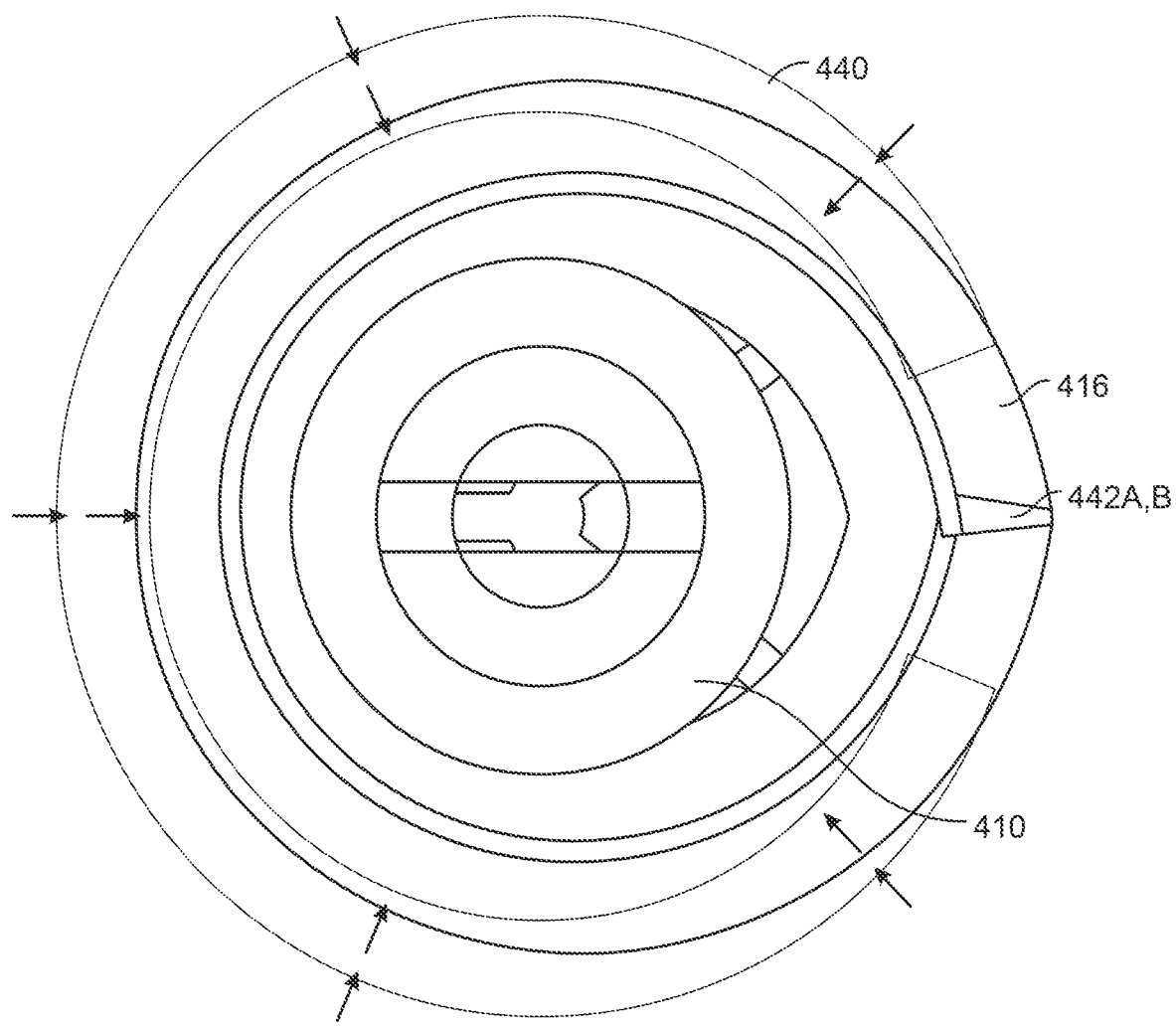
FIG. 4C depicts a front view of a moveable pin with a compressed elastic taper C-ring according to one aspect of the present disclosure.

FIGS. 4A-4C depict an arrangement of a moveable pin 410 and a C-Ring 416 according to an aspect of the present disclosure. FIG. 4A depicts a side view of a moveable pin 410 with an elastic taper C-ring 416 according to one aspect of the present disclosure. The elastic taper C-ring 416 may be disposed about a pin notch 412 while the moveable pin 410 is at a pin rest position. The elastic taper C-ring 416 includes a first elastic taper C-ring side 418 and a second elastic taper C-ring side 420. FIG. 4B depicts a front view of a moveable pin 410 with an uncompressed elastic taper C-ring 416 about the pin notch 412 according to one aspect of the present disclosure. A first end 442A of the elastic taper C-ring and the second end 442B form a gap and are not in contact with each other. FIG. 4C depicts a front view of a moveable pin 410 with a compressed elastic taper C-ring 416 according to one aspect of the present disclosure. As shown in FIG. 4C, the original circumference (shown here as reference number 440) of the elastic taper C-ring 416 may be compressed from its original shape. In a compressed state the ends 442A, 442B of the C-Ring may become in contact with each other.

Figure 5A:
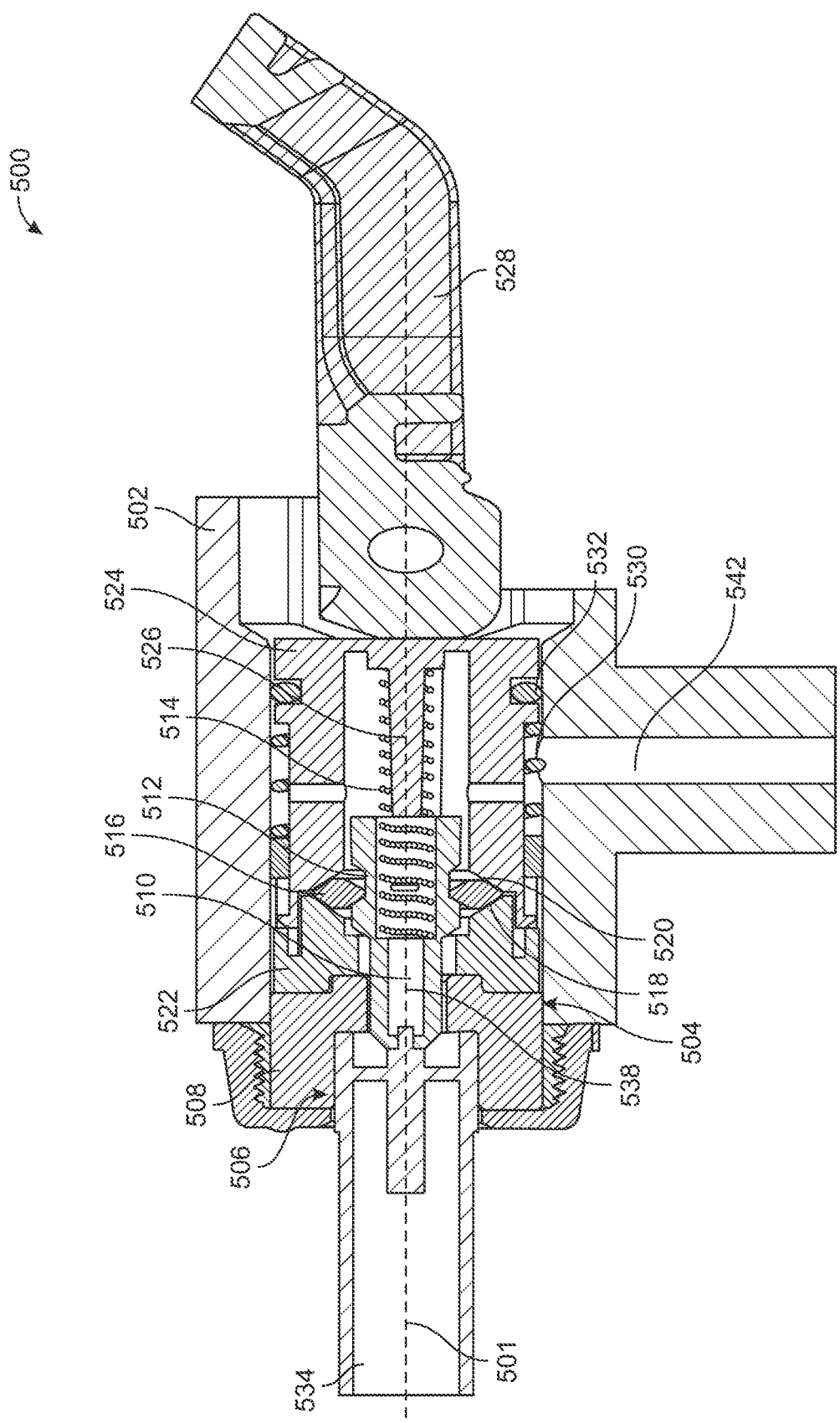
FIG. 5A depicts a side cross section view of a pump head connected to a Schrader air valve according to one aspect of the present disclosure.
Figure 5B:
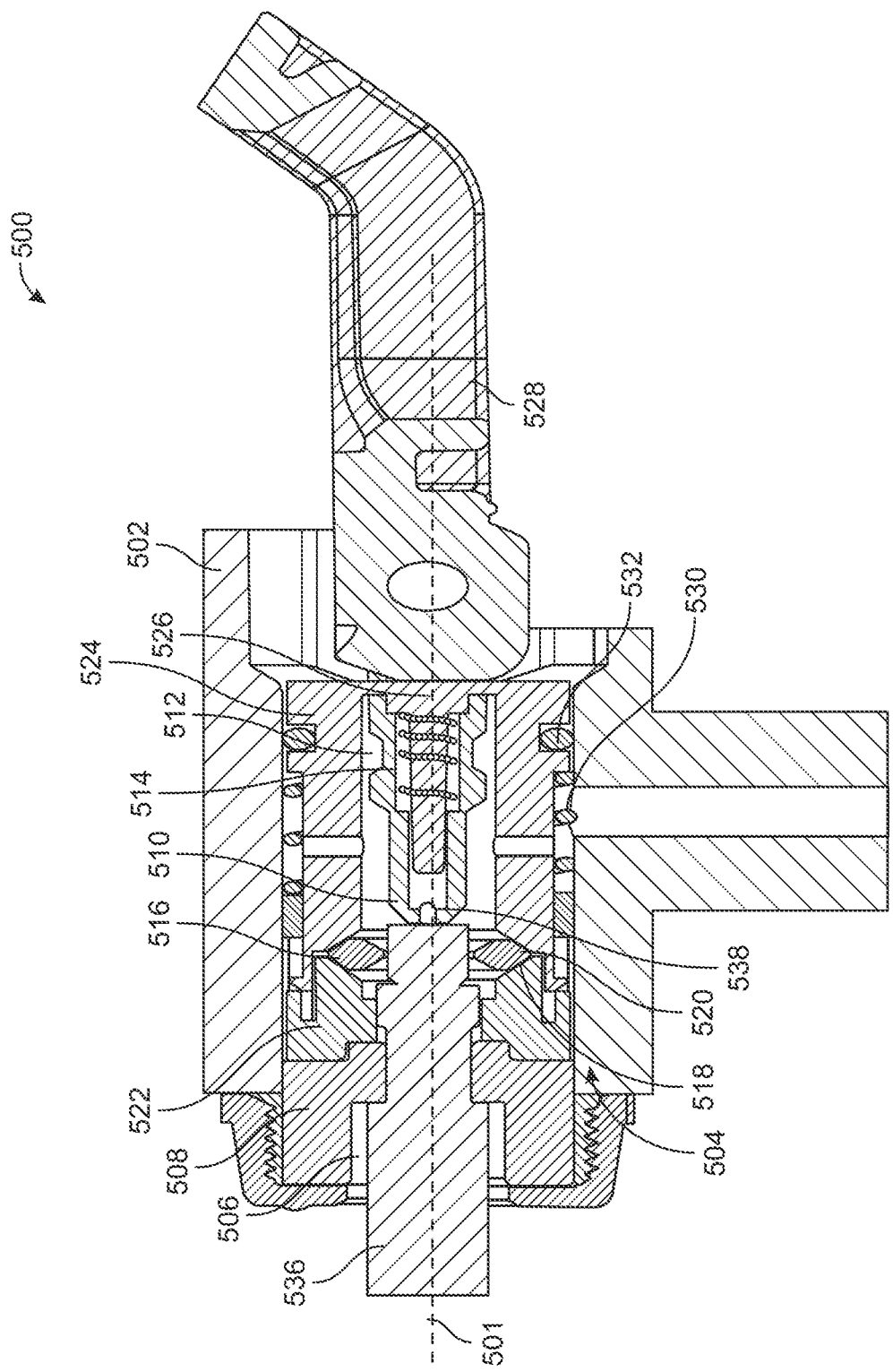
FIG. 5B depicts a side cross section view of a pump head connected to a Presta air valve according to one aspect of the present disclosure.

FIG. 5A depicts a side cross section view of a pump head 500 connected to a Schrader-type air valve 534 according to one aspect of the present disclosure. The Schrader-type air valve 534 may be operatively coupled to the pump head 500 for exchanging air with an air chamber (not shown). The pump head 500 may include a housing 502 that defines an aperture 506. The pump head 500 may further include a grommet 508 disposed between the aperture 506 and the housing 502. The grommet 508 may include a first portion 509 sized and shaped to accommodate a Schrader-type valve and second portion 511 sized and shaped to accommodate a Presta-type valve.

A lock arm 528 may be engaged to secure the pump head 500 to the Schrader-type air valve 534. The lock arm 528 may be operatively connected to an interior unit 504 including a first taper unit 522, a second taper unit 524, and an elastic taper C-ring 516 therebetween, all coaxially located along an axis 501 of the housing 502. The elastic taper C-ring 516 may include a first elastic taper C-ring side 518 adjacent to the first taper unit 522 and a second elastic taper C-ring side 520 adjacent to the second taper unit 524. Raising the lock arm 528 may engage the Schrader-type air valve 534 by pressing the second taper unit 524 against the bias of a withdraw spring 530 towards the first taper unit 522, compressing the elastic taper C-ring 516.

A moveable pin 510 within the interior unit 504 is coupled to a pin return spring 514. A guide 526 may be positioned along an axis of the moveable pin 510. The guide 526 may be operatively configured to assist the moveable pin 510 in moving within the interior unit 504. The guide may be operatively connected to the pin return spring 514.

A pin notch 512 on the exterior of the moveable pin 510 may be operatively sized to receive the compressed elastic taper C-ring 516. The moveable pin 510 may be secured in place by the compressed elastic taper C-ring 516 while the lock arm 528 is engaged. By securing the moveable pin 510, the moveable pin 510 may exert a force on the Schrader air valve 534. The pin head notch 538 of moveable pin 510 may engage a pin of the valve 534 to open the Schrader-type air valve 534 and allow an exchange of air to take place. As a result, an air chamber (not shown) may be inflated or deflated using the pump head 500.

When the lock arm 528 is disengaged, the withdraw spring 530 may allow the second taper unit 524 to move away from the first taper unit 522. The elastic taper C-ring 516 is decompressed and the moveable pin 510 is allowed to move. A pin return spring 514 may be used to return the moveable pin 510 to a pin rest position.

An O-ring 532 may be disposed between the interior unit 504 and the housing 502 to form a seal around the interior unit 504. As a result, air passes through an air-flow channel 542 and into the interior unit 504 into and out of the Schrader air valve 534. The O-ring 532 may prevent the air in the air-flow channel from escaping the pump head at or near the lock arm 528.

In operation, according to one aspect of the disclosure, the pump head 500 may be fluidly connected to an air valve, such as a Schrader-type air valve 534. The Schrader air valve 534 is inserted into the aperture 506 until the Schrader air valve 534 is sealed against at least the first portion 509 of the grommet 508. The moveable pin 510 may be biased towards the valve 534 such that the pin head notch 538 of moveable pin 510 may engage a pin of the valve 534 to open the Schrader-type air valve 534. The lock arm 528 may be engaged, pressing the second taper unit 524 towards the first taper unit 522 and compressing the elastic taper C-ring 516 in a first position. The grommet 508 may also be compressed around the valve 534 forming a seal. The elastic taper C-ring 516, disposed about the pin notch 512, may close around the moveable pin 510 in the pin notch 512 securing the moveable pin in place. A pumping mechanism (not shown) may cause an exchange of air to occur, inflating or deflating an air chamber (not shown) fluidly connected to the Schrader-type air valve 534.

The lock arm 528 may be disengaged by pivoting the lock arm 528 downward, for example, allowing the withdraw spring 530 to move the second taper unit 524 away from the first taper unit 522. The elastic taper C-ring 516 may be decompressed, releasing the moveable pin 510. The Schrader-type air valve 534 may be removed, and the moveable pin 510 may return to a pin rest position by the pin return spring 514.

FIG. 5B depicts a side cross section view of a pump head 500 connected to a Presta-type air valve 536 according to one aspect of the present disclosure. The Presta air valve 536 may be fluidly connected to the pump head 500 for exchanging air with an air chamber (not shown). As the Presta air valve 536 is inserted into the aperture 506, the head of the Presta-type air valve 536 may engage the second portion 511 of the grommet 508 and exert a force on the moveable pin 510. A head pin of the valve may engage or enter the pin head notch 538. The moveable pin 510 may travel along the guide 526 compressing the pin return spring 514 while maintaining contact with the Presta-type air valve 536.

The lock arm 528 may be engaged to press the first taper unit 522 against the second taper unit 524, compressing the elastic taper C-ring 516 between the first taper unit 522 and the second taper unit 524 and about the pin notch 512, and compressing the grommet 508 about the Presta-type air valve 536, where a seal is formed, securing the Presta-type air valve 536 in place. The force exerted by the Presta air valve 536 on the moveable pin 510 may open the air valve 536 to allow an exchange of air to occur.

When the lock arm 528 is disengaged, the withdraw spring 530 may allow the second taper unit 524 to move away from the first taper unit 522. The elastic taper C-ring 516 may be decompressed and the grommet 508 may be decompressed, allowing the Presta-type air valve 536 to be removed from the pump head 500.

In operation, according to one aspect of the disclosure, the pump head 500 may be fluidly connected to an air valve, such as a Presta-type air valve 536. The Presta-type air valve 536 may be inserted into the aperture 506 and through or past the grommet 508 until the head of the Presta-type air valve 536 is adjacent to the elastic taper C-ring elastic taper elastic taper C-ring 516 and the head pin of the valve engages the pin head notch 538. The moveable pin 510 may move along the guide 526, compressing the pin return spring 514 and establishing a connection with the Presta-type air valve 536. The lock arm 528 may be engaged, pressing the second taper unit 524 towards the first taper unit 522, compressing the elastic taper C-ring 516 in a second position. The elastic taper C-ring 516, disposed about the Presta-type air valve 536, closes around the Presta air valve 536. As a result, the Presta-type air valve 536 is secured in place. An exchange of air may occur, inflating or deflating an air chamber (not shown) fluidly connected to the Presta-type air valve 536.

The lock arm 528 may be disengaged, allowing the withdraw spring 530 to move the second taper unit 524 away from the first taper unit 522. The elastic taper C-ring 516 is decompressed, releasing the Presta-type air valve 536. The Presta-type air valve 536 may be removed, and the moveable pin 510 may return to the pin rest position by the pin return spring 514.

One skilled in the art will appreciate that the same embodiment of the pump head may be used for multiple types of air valves, such as those described above. The pump head allows a user to form an airtight connection simply by engaging a lock arm without a need to consider the type of air valve being connected. As a result, a smaller, more lightweight pump head has been described in this disclosure.

Although embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims. The detailed description and drawings are merely illustrative of the present disclosure rather than limiting, the scope of the present disclosure being defined by the appended claims and equivalents thereof.

Benefits, other advantages, and solutions to problems have been described herein with regard to specific embodiments. However, the benefits, advantages, solutions to problems, and elements that may cause any benefit, advantage, or solution to occur or become more pronounced are not to be construed as critical, required, or essential features or elements of the disclosure.

It should be understood that when an element is referred to as being "connected" or "coupled" to another element (or variations thereof), it can be directly connected or coupled to the other element or intervening elements may be present.

Further, it should be appreciated that in the appended claims, reference to an element in the singular is not intended to mean "one and only one" unless explicitly so stated, but rather "one or more."

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The words "illustrative" or "exemplary" are used herein to mean "serving as an example, instance, or illustration." Any aspect described herein as "illustrative" or "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A pump head comprising:
   a housing defining an aperture about a first axis, the aperture sized and shaped to receive a valve head therein;
   a moveable pin disposed within the housing coaxially with the first axis; the moveable pin defining a pin notch disposed about an exterior circumference of the moveable pin;
   a pin return spring coupled to the moveable pin and coaxially with the first axis, the pin return spring biasing the moveable pin towards the aperture;
   a first taper unit disposed in the housing coaxially with the first axis;
   a second taper unit coupled to the pin return spring, the second taper unit disposed in the housing coaxially with the first axis and adjacent to the first taper unit, the second taper unit biased away the first taper unit; and an elastic taper C-ring disposed between the first and second taper units,
wherein the second taper unit is moveable towards the first taper unit, thereby compressing the elastic taper C-ring circumferentially in at least one of two positions, the elastic taper C-ring compressed about the pin notch in the first position and about the valve head in the second position.

2. The pump head of claim 1, further comprising a grommet disposed between the housing and the aperture.

3. The pump head of claim 2, wherein the grommet provides a sealing engagement around the valve head when inserted into the housing.

4. The pump head of claim 3, wherein the grommet is fabricated from a compressible material.

5. The pump head of claim 1, further comprising an O-ring between the second taper unit and the housing to provide a moveable seal between the second taper unit and the housing.

6. The pump head of claim 1, wherein the first taper unit is fixed within the housing.

7. The pump head of claim 1, wherein the second taper unit comprises a guide positioned along the first axis and coupled to the return spring.

8. The pump head of claim 1, further comprising a lock arm coupled to the housing and configured to advance the second taper unit towards the first taper unit.

9. The pump head of claim 1, wherein the elastic C-ring defines a first elastic taper C-ring side adjacent the first taper unit and a second elastic taper C-ring side adjacent the second taper unit.

10. The pump head of claim 1, wherein the valve head is a Schrader-type air valve or a Presta-type air valve.

11. A pump head comprising:
a housing defining an aperture about a first axis, the aperture sized and shaped to receive a valve head therein;
a grommet disposed between the housing and the aperture, the grommet comprising a first portion sized and shaped to accommodate a Schrader-type valve head and a second portion sized and shaped to accommodate a Presta-type valve head;
a moveable pin disposed within the housing coaxially with the first axis; the moveable pin defining a pin notch disposed about an exterior circumference of the moveable pin;
a pin return spring coupled to the moveable pin and coaxially with the first axis, the pin return spring biasing the moveable pin towards the aperture;
a first taper unit disposed in the housing coaxially with the first axis;
a second taper unit coupled to the pin return spring, the second taper unit disposed in the housing coaxially with the first axis and adjacent to the first taper unit, the second taper unit biased away the first taper unit; and
an elastic taper C-ring disposed between the first and second taper units,
wherein the second taper unit is moveable towards the first taper unit, thereby compressing the elastic taper C-ring circumferentially in at least one of two positions, the elastic taper C-ring compressed about the pin notch in the first position and about the valve head in the second position.

12. The pump head of claim 11, wherein the moveable pin defines a pin head notch configured to engage a pin of the valve head.

13. The pump head of claim 11, wherein the grommet provides a sealing engagement around the valve head when inserted into the housing.

14. The pump head of claim 13, wherein the grommet is fabricated from a compressible material.

15. The pump head of claim 11, further comprising an O-ring between the second taper unit and the housing to provide a moveable seal between the second taper unit and the housing.

16. The pump head of claim 11, wherein the first taper unit is fixed within the housing.

17. The pump head of claim 11, wherein the second taper unit comprises a guide positioned along the first axis and coupled to the return spring.

18. The pump head of claim 11, further comprising a lock arm coupled to the housing and configured to advance the second taper unit towards the first taper unit.

19. The pump head of claim 11, wherein the elastic C-ring defines a first elastic taper C-ring side adjacent the first taper unit and a second elastic taper C-ring side adjacent the second taper unit.

20. The pump head of claim 11, wherein the grommet is sized to allow the Presta-type valve to extend through the first and second portion of the grommet.

* * * * *